(12) United States Patent
Koung et al.

(10) Patent No.: US 11,358,703 B2
(45) Date of Patent: Jun. 14, 2022

(54) MONOLITHIC WING TO SIDE BODY UPPER CHORD ASSEMBLY FOR AIRCRAFT

(71) Applicant: The Boeing Company, Chicago, IL (US)

(72) Inventors: Tony Koung, Seattle, WA (US); Daniel Harvey Fletcher, Lake Forest Park, WA (US); Michael Robert Rush, Edmonds, WA (US); Jacob Richard Medlang, Renton, WA (US)

(73) Assignee: The Boeing Company, Chicago, IL (US)

( * ) Notice: Subject to any disclaimer, the term of this patent is extended or adjusted under 35 U.S.C. 154(b) by 188 days.

(21) Appl. No.: 16/822,545

(22) Filed: Mar. 18, 2020

(65) Prior Publication Data
US 2021/0291958 A1 Sep. 23, 2021

(51) Int. Cl.
*B64C 1/26* (2006.01)
*B64C 1/06* (2006.01)
(52) U.S. Cl.
CPC ............... *B64C 1/26* (2013.01); *B64C 1/064* (2013.01)
(58) Field of Classification Search
None
See application file for complete search history.

(56) References Cited

U.S. PATENT DOCUMENTS

| 6,775,895 B2 * | 8/2004 | Koffi | F16B 5/00 |
| | | | 29/407.08 |
| 2007/0033980 A1 * | 2/2007 | Nishimura | B23P 6/04 |
| | | | 72/362 |
| 2010/0170986 A1 * | 7/2010 | Lafly | B23K 20/1225 |
| | | | 244/119 |

* cited by examiner

*Primary Examiner* — Alexander S Thomas
(74) *Attorney, Agent, or Firm* — Yee & Associates, P.C.

(57) ABSTRACT

A monolithic joint system for a fuselage to wing joint in an aircraft is provided. The joint system comprises a first vertical flange, a base plate, a second vertical flange, and damage containment features associated with at least one of these components. The first vertical flange is configured to connect to a fuselage section of the aircraft and the second vertical flange is configured to connect to a rib web of a wing, while the base plate attaches outboard wing to inboard wing box. The first vertical flange, the base plate, and the second vertical flange are formed from a continuous piece of material. The damage containment features are configured to slow propagation of an active crack tip in the joint system during operation of the aircraft. Thus, the illustrative embodiments provide a one-piece joint system for the fuselage to wing joint of an aircraft.

20 Claims, 14 Drawing Sheets

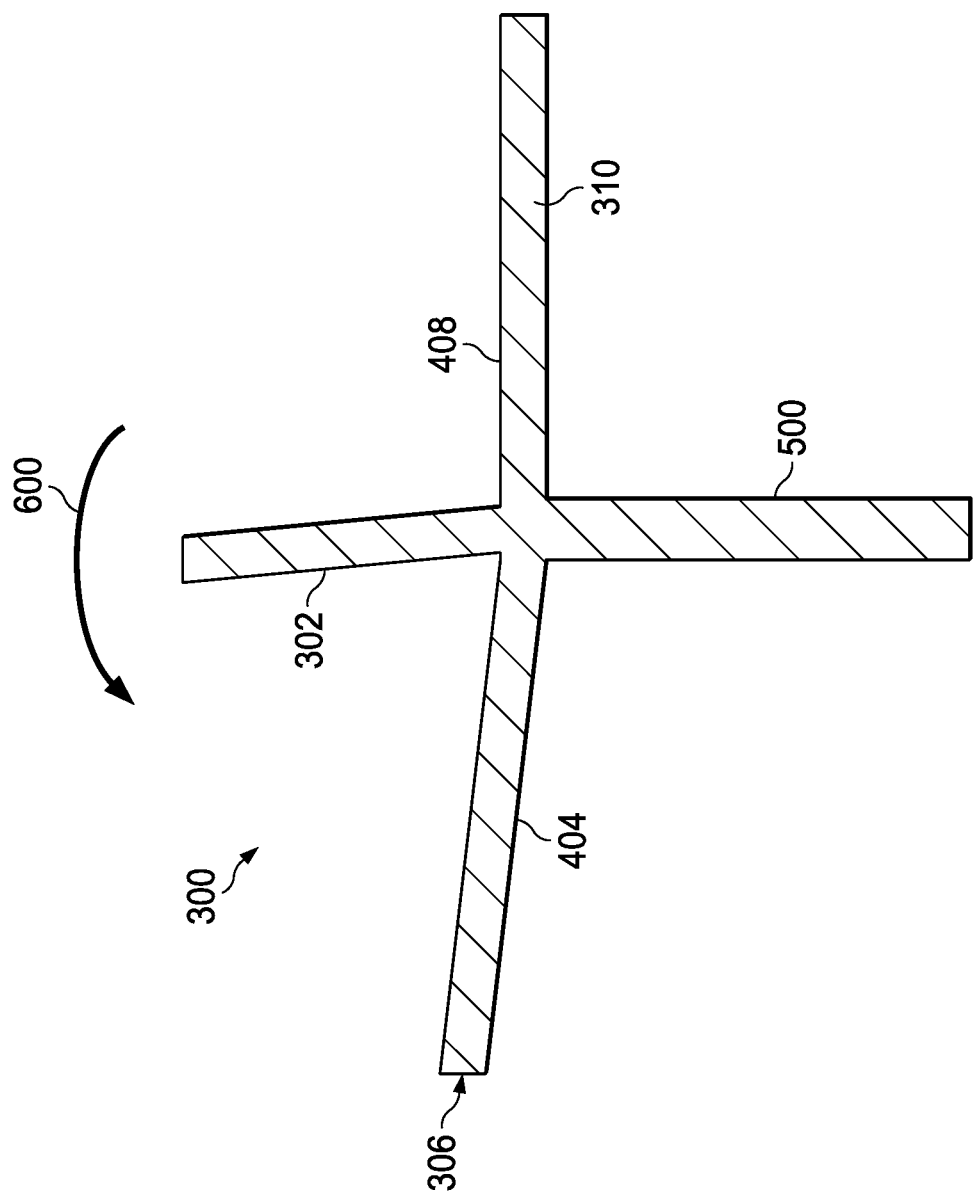

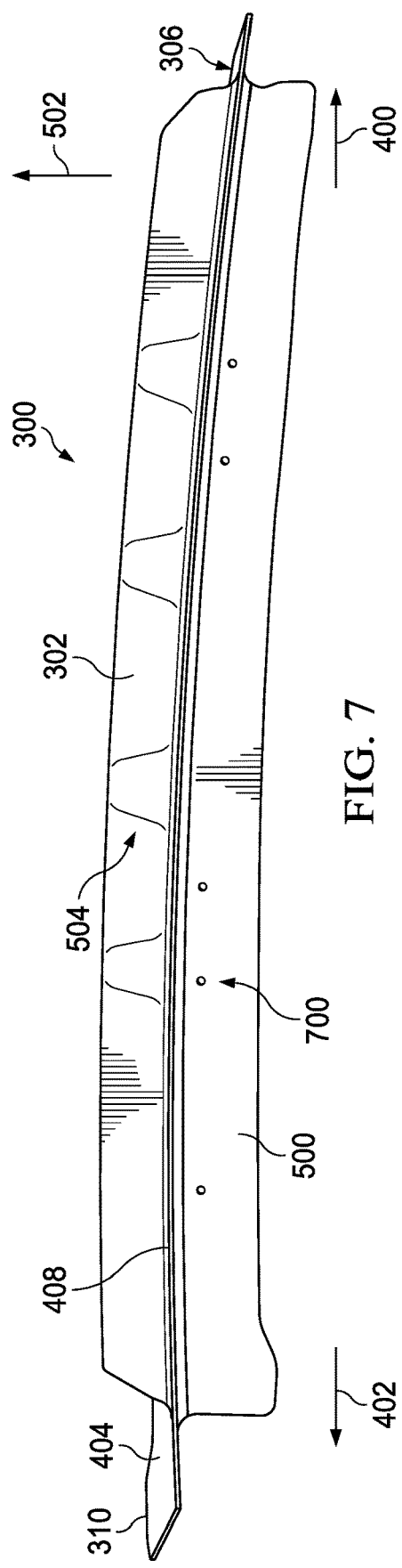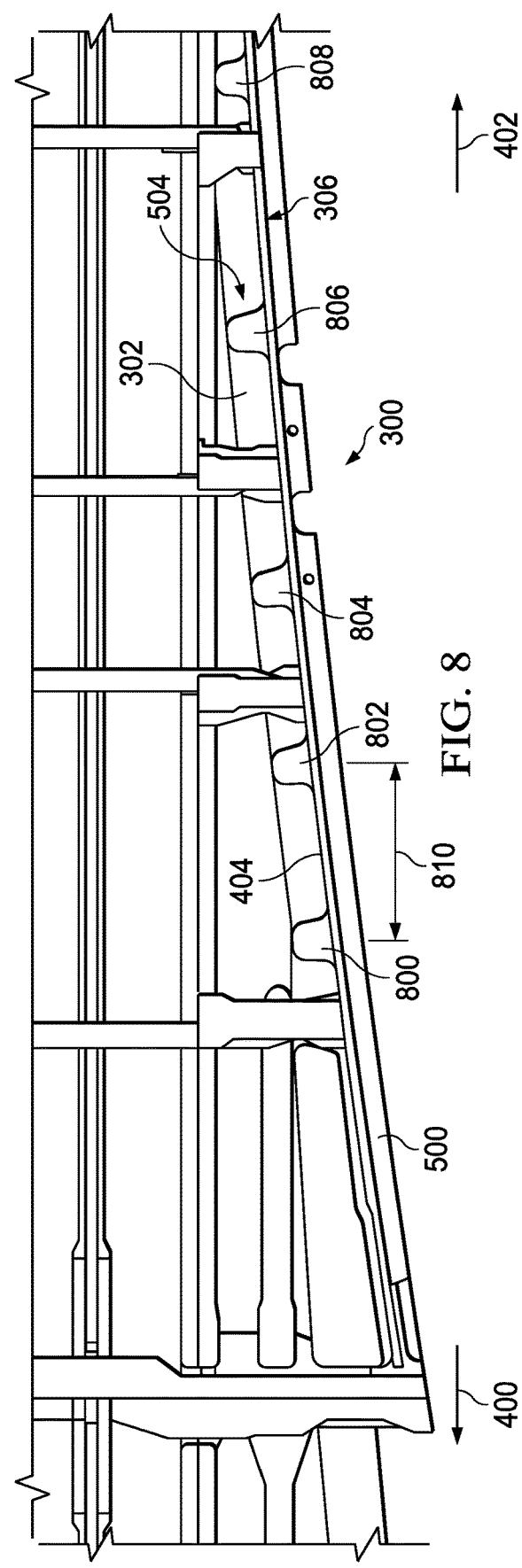

MONOLITHIC WING TO SIDE BODY UPPER CHORD ASSEMBLY FOR AIRCRAFT

BACKGROUND INFORMATION

1. Field

The present disclosure relates generally to joining primary structural components in aircraft. More specifically, the present disclosure relates to a monolithic wing to side body upper chord assembly for an aircraft.

2. Background

Manufacturers are constantly looking for ways to decrease the time and complexity of assembling aircraft. Manufacturers also seek to reduce the weight of the aircraft while preserving its ability to operate safely and efficiently.

Fuselage to wing joints are complex joints to assemble. Such joints require hundreds of fasteners and various metal parts. Fuselage to wing joints commonly include an attachment to the fuselage skin, a splicing member of the outboard and inboard upper wing skins, and a wing rib chord feature connected to one another. The metal parts and fasteners used for these joints comprise a large portion of the weight of the aircraft.

Joints must be designed with damage containment in mind, especially when joining the fuselage and wing skin in a composite aircraft. Damage containment allows aircraft manufacturers to meet the regulatory and non-regulatory structural requirements of the parts that comprise the fuselage to wing joint. Even small cracks at the joint may become detrimental.

Therefore, it would be desirable to have a method and apparatus that takes into account at least some of the issues discussed above, as well as other possible issues.

SUMMARY

An illustrative embodiment of the present disclosure provides a joint system for an aircraft comprising a first vertical flange, a base plate, a second vertical flange, and damage containment features associated with the first vertical flange. Damage containment features may also be associated with the base plate and the second vertical flange as well. The first vertical flange is configured to connect to a fuselage section of the aircraft and the second vertical flange is configured to connect to a rib web of a wing. The first vertical flange, the base plate, and the second vertical flange are formed from a continuous piece of material along an upper chordwise length of the wing. The damage containment features are configured to slow propagation of an active crack tip in the first vertical flange. In some instances, damage containment features in the base plate and/or the second vertical flange also slow propagation of a crack.

Another illustrative embodiment of the present disclosure provides a monolithic upper chord assembly. The monolithic upper chord assembly comprises a first vertical flange, a base plate connected to the first vertical flange, a second vertical flange opposite the first vertical flange and connected to the base plate, and damage containment features associated with at least one of the first vertical flange and the base plate. The first vertical flange, the second vertical flange and the base plate are formed from a continuous piece of material.

A further illustrative embodiment of the present disclosure provides a method for joining a fuselage section to a wing in an aircraft. A first vertical flange of a joint system is connected to a fuselage section of the aircraft. A base plate, connected to the first vertical flange and a second vertical flange of the joint system, is connected to a wing skin. The second vertical flange of the joint system to a rib web of a wing. The first vertical flange, the second vertical flange and the base plate are formed from a continuous piece of material along an upper chordwise length of the wing. At least one of the first vertical flange and the base plate comprise damage containment features configured to slow propagation of a crack in the first vertical flange.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 6 is an illustration of a cross-sectional view of a monolithic upper chord assembly in accordance with an illustrative embodiment;

FIG. 7 is an illustration of a side view of a monolithic upper chord assembly with damage containment features in accordance with an illustrative embodiment;

FIG. 8 is an illustration of a monolithic upper chord assembly with damage containment features in accordance with an illustrative embodiment;

DETAILED DESCRIPTION

The illustrative embodiments recognize and take into account one or more different considerations. For example, the illustrative embodiments recognize and take into account that design considerations for joint systems that connect composite wing to fuselage joints have unique structural considerations. Some currently contemplated joint systems for fuselage to wing joints include an over-wing T-chord (OWT) that is segmented. When a crack occurs in a segment of the OWT, crack tip propagation is limited to just one segment, thus maintaining the integrity of the wing to body connection over a number of cycles of operations for the aircraft.

The illustrative embodiments also recognize and take into account that each segment of the joint system must be fastened to one another. In addition, some currently contemplated joint systems for composite aircraft combine the fuselage attachment, the splicing feature, and a rib t-chord to secure the joint. These three components are fastened together as an assembly. The number of fasteners needed for a joint system with a segmented side of body upper chord assembly adds weight to the aircraft, increases the cost of assembly, and increases build time.

Further, the illustrative embodiments recognize and take into account that the fuselage to wing joint is critical for maintaining the integrity of the aircraft. Manufacturing standards may require damage scenarios for a period of unrepaired use at standard operating loads.

Thus, the disclosed embodiments provide a joint system for an aircraft comprising a first vertical flange, a second vertical flange, a base plate, and damage containment features associated with at least one of the first vertical flange and the base plate. The first vertical flange is configured to connect to a fuselage section of the aircraft. The base plate is configured to connect to the wing skin. The second vertical flange is configured to connect to a rib web of the wing. The first vertical flange, the second vertical flange, and the base plate are formed from a continuous piece of material along an upper chordwise length of the wing. The damage containment features are configured to reduce propagation of a crack in the joint system.

Figure 1:
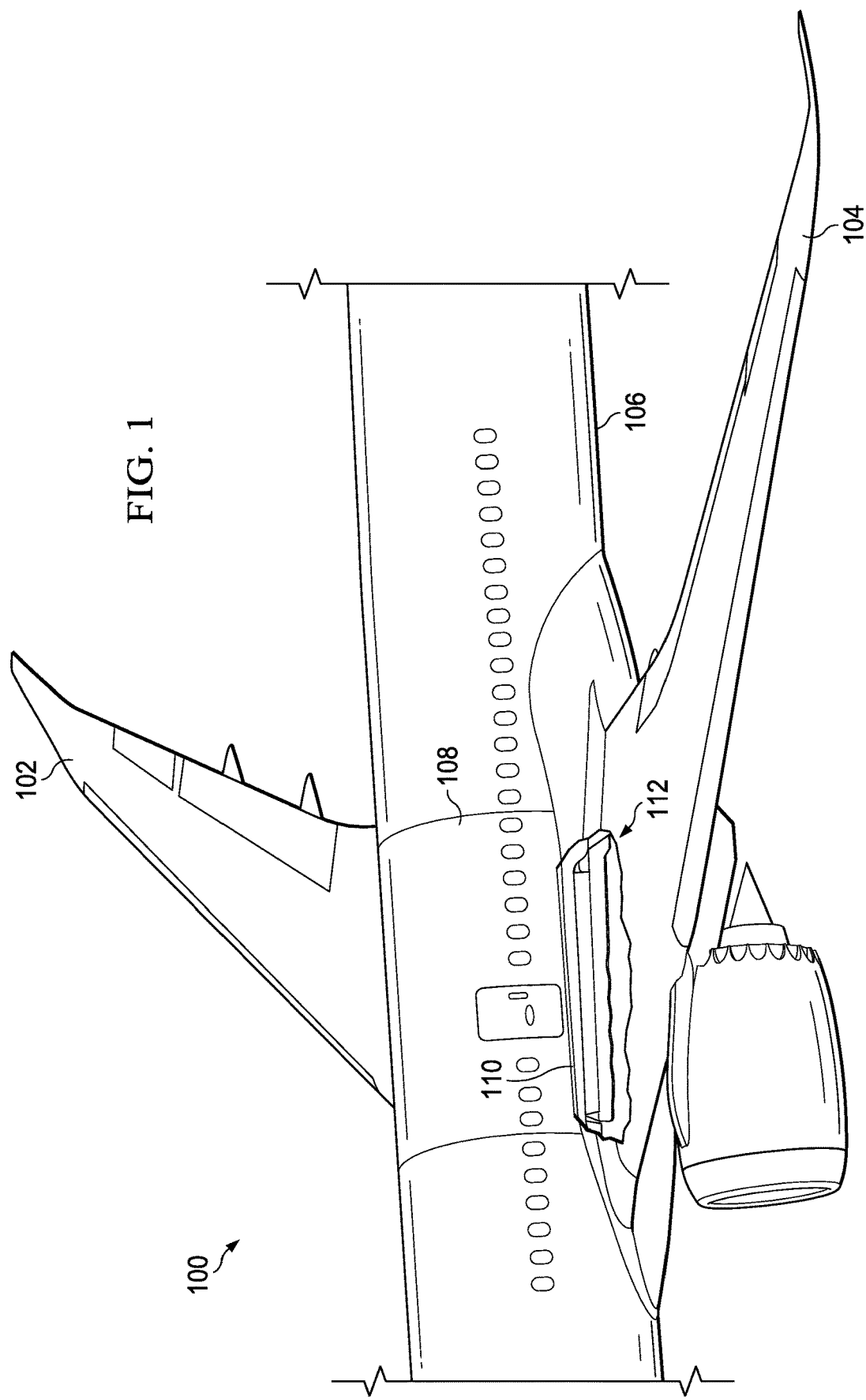
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to fuselage 106. Fuselage 106 has section 108. Section 108 of fuselage 106 is connected to wing 104 at joint 110. Joint 110 comprises joint system 112.

Joint system 112 comprises a number of structural components connecting section 108 of fuselage 106 to wing 104. As used herein, "a number of" when used with reference to items means one or more items. Thus, a number of components is one or more components. Joint system 112 at joint 110 is shown in greater detail in FIG. 3.

Figure 2:
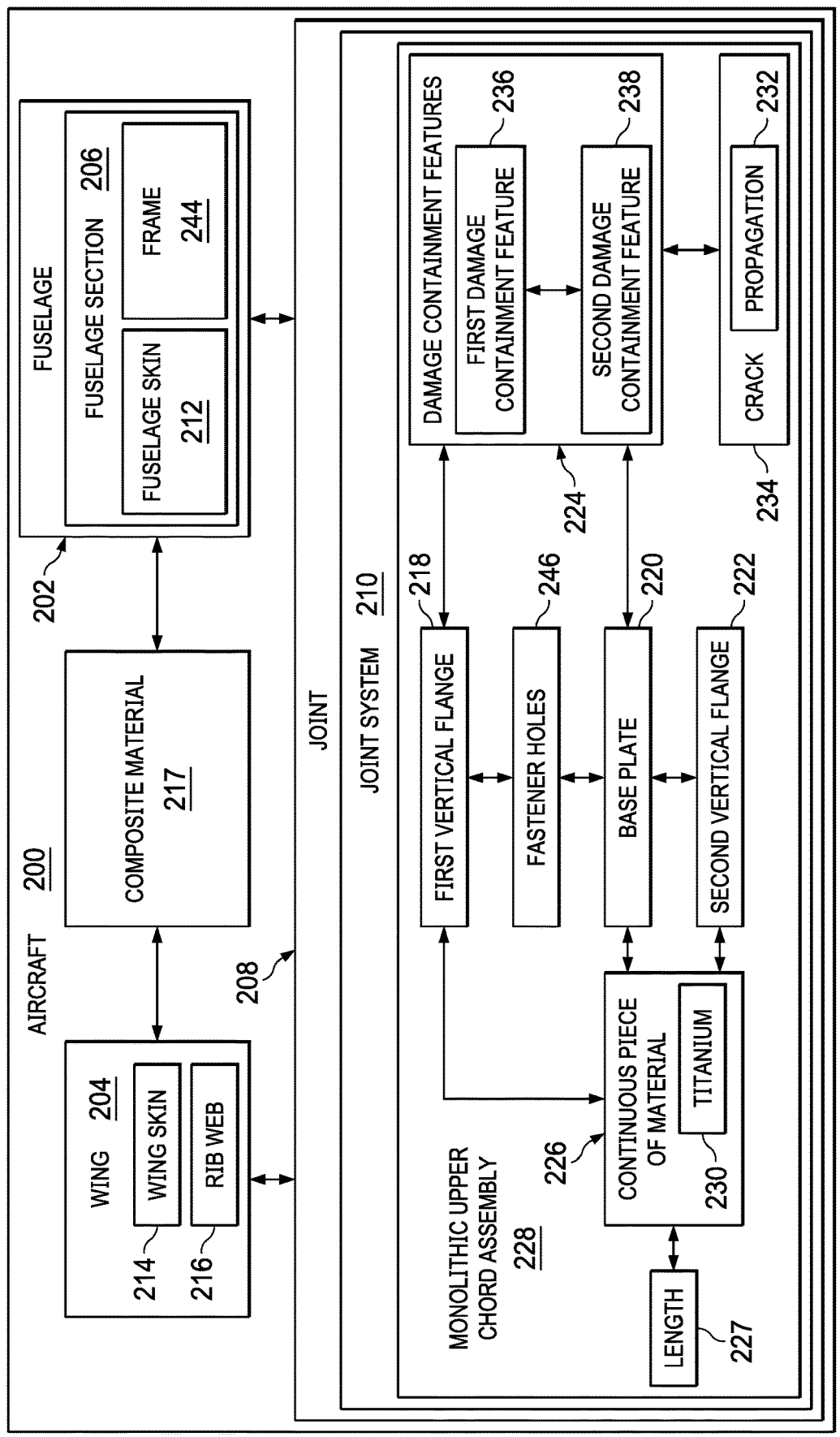
FIG. 2 is an illustration of a block diagram of a joint system in accordance with an illustrative embodiment.

Turning now to FIG. 2, an illustration of a block diagram of a joint system is depicted in accordance with an illustrative embodiment. Aircraft 100 in FIG. 1 is an example of a physical implementation of aircraft 200 shown in block form in this figure.

As depicted, aircraft 200 comprises fuselage 202 and wing 204. Fuselage section 206 is the portion of fuselage 202 directly above wing 204. Fuselage section 206 connects to wing 204 at joint 208.

In this illustrative example, joint system 210 is used to connect fuselage section 206 to wing 204. Specifically, joint system 210 connects fuselage skin 212 of fuselage section 206 to wing skin 214, rib web 216 of wing 204, and/or other structural components within wing 204. In this manner, joint system 210 is a wing to side-of-body upper chord assembly.

Fuselage section 206 and wing skin 214 comprise composite material 217. Thus, aircraft 200 is a composite aircraft in this illustrative example.

As illustrated, joint system 210 comprises first vertical flange 218, base plate 220, second vertical flange 222, and damage containment features 224. First vertical flange 218 is a structural member configured to connect to fuselage section 206 above wing 204. First vertical flange 218 is an upper flange of joint system 210 in this illustrative example. First vertical flange 218 replaces the traditionally used attachment structure that connects to the fuselage skin. As used herein, "vertical" contemplates a flange that is not strictly vertical. For example, without limitation, the flange may have a variable angle. In other words, base plate 220 and first vertical flange 218 may be perpendicular to one another or exist at some other angle more or less than ninety degrees. In a similar fashion, base plate 220 and second vertical flange 222 may be perpendicular to one another, or exist at some other angle more or less than ninety degrees.

Base plate 220 is a structural member connected to first vertical flange 218. Base plate 220 is configured to connect to wing skin 214 of aircraft 200. First vertical flange 218 bifurcates base plate 220 in this illustrative example. The lateral most portion of base plate 220 connects to the outer portion of wing skin 214, outside aircraft 200, while the medial most portion of base plate 220 connects to the inner portion of wing skin 214, inside aircraft 200. Base plate 220 replaces the splicing member of the outboard and inboard upper wing skins in traditional systems.

In this illustrative example, second vertical flange 222 is oriented opposite first vertical flange 218. Second vertical flange 222 is connected to base plate 220, below base plate 220. Second vertical flange 222 is configured to connect to rib web 216 of wing 204. Second vertical flange 222 also connects the upper portion of wing skin 214 to the lower portion of wing skin 214, as well as the front and rear spars of wing 204 at the side body of fuselage 202. Second vertical flange 222 bifurcates base plate 220. Second vertical flange 222 replaces the wing rib chord feature that closes out the web of the wing box in traditional systems.

As depicted, first vertical flange 218, second vertical flange 222, and base plate 220 are formed from continuous piece of material 226 along upper chordwise length 227 of wing 204. In other words, first vertical flange 218, second vertical flange 222, and base plate 220 are formed from a single piece of material. Therefore, joint system 210 fabricated in this manner takes the form of monolithic upper chord assembly 228. Joint system 210 may also be referred to as an "integral" upper chord assembly or a "one-piece" upper chord assembly in these illustrative examples.

Continuous piece of material 226 may comprise, for example, without limitation, a metal, a metal alloy, titanium, aluminum, steel, aluminum-lithium, or some other suitable metal or non-metal material. Monolithic upper chord assembly 228 formed of continuous piece of material 226 comprises titanium 230 in this illustrative example. In other illustrative examples, other materials may be used.

Damage containment features 224 are structural components associated with at least one of first vertical flange 218, base plate 220, and second vertical flange 222 of joint system 210. For example, without limitation, damage containment features 224 may be formed as part of these components, connected to these components, or associated with these components in some other manner. In some illustrative examples, damage containment features 224 may be associated with only one of these components (218, 220, 222), two of these components or all three of these components at the same time.

Damage containment features 224 may take a variety of different forms. For instance, damage containment features 224 may take the form of at least one of clips, slots, pad ups, doublers, gussets, or some other suitable damage containment feature.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

As illustrated, damage containment features 224 are configured to slow propagation 232 of crack 234 in at least one of first vertical flange 218, base plate 220, and second vertical flange 222 Specifically, propagation 232 of crack 234 is limited to the space between first damage containment feature 236 and second damage containment feature 238 over desired number of cycles of operation of aircraft 200. Crack 234 is an active crack tip in this illustrative example.

Monolithic upper chord assembly 228 with damage containment features 224 allow for crack retardation or stoppage when first vertical flange 218 is subject to chordwise flexure. Damage containment features 224 may be positioned relative to first vertical flange 218, base plate 220, and/or second vertical flange 222 based on the type of loads experienced at that particular location. The spacing between damage containment features 224 may be selected based on the loads experienced at different locations along the components in monolithic upper chord assembly 228. One or more different types of damage containment features 224 may be oriented on the outer surface of first vertical flange 218, on the inner surface of first vertical flange 218, or both. One or more different types of damage containment features 224 may be oriented on the outer surface of base plate 220, on the inner surface of base plate 220, or both. Any combination of damage containment features 224 may be used, depending on the particular implementation. In some cases, one of damage containment features 224 align with a structural component in frame 244 of fuselage section 206 when first vertical flange 218 of monolithic upper chord assembly 228 is connected to fuselage section 206.

In this illustrative example, fastener holes 246 are formed in at least one of first vertical flange 218, base plate 220, and second vertical flange 222. Fastener holes 246 receive fasteners to connect first vertical flange 218 to fuselage skin 212. Fasteners also connect base plate 220 to wing skin 214 and second vertical flange 222 to rib web 216. One of damage containment features 224 may be located between two fastener holes 246. In this manner, damage containment features 224 reduce propagation 232 of crack 234 propagating from either the critical end fastener or from the frame fastener location. Damage containment features 224 are located and sized in these areas to stop or sufficiently dwell crack 234.

With an illustrative embodiment, damage containment features 224 arrest damage at joint 208 between fuselage 202 and wing 204. Since joint system 210 is monolithic, no fasteners are needed to connect the upper vertical flange, lower vertical flange, and base plate. Significant weight savings and manpower savings are realized. Joint system 210 may be formed more quickly than with some currently used solutions and out of a single type of material. Joint system 210 configured in this manner allows for an upper chord assembly for composite aircraft.

Figure 3:
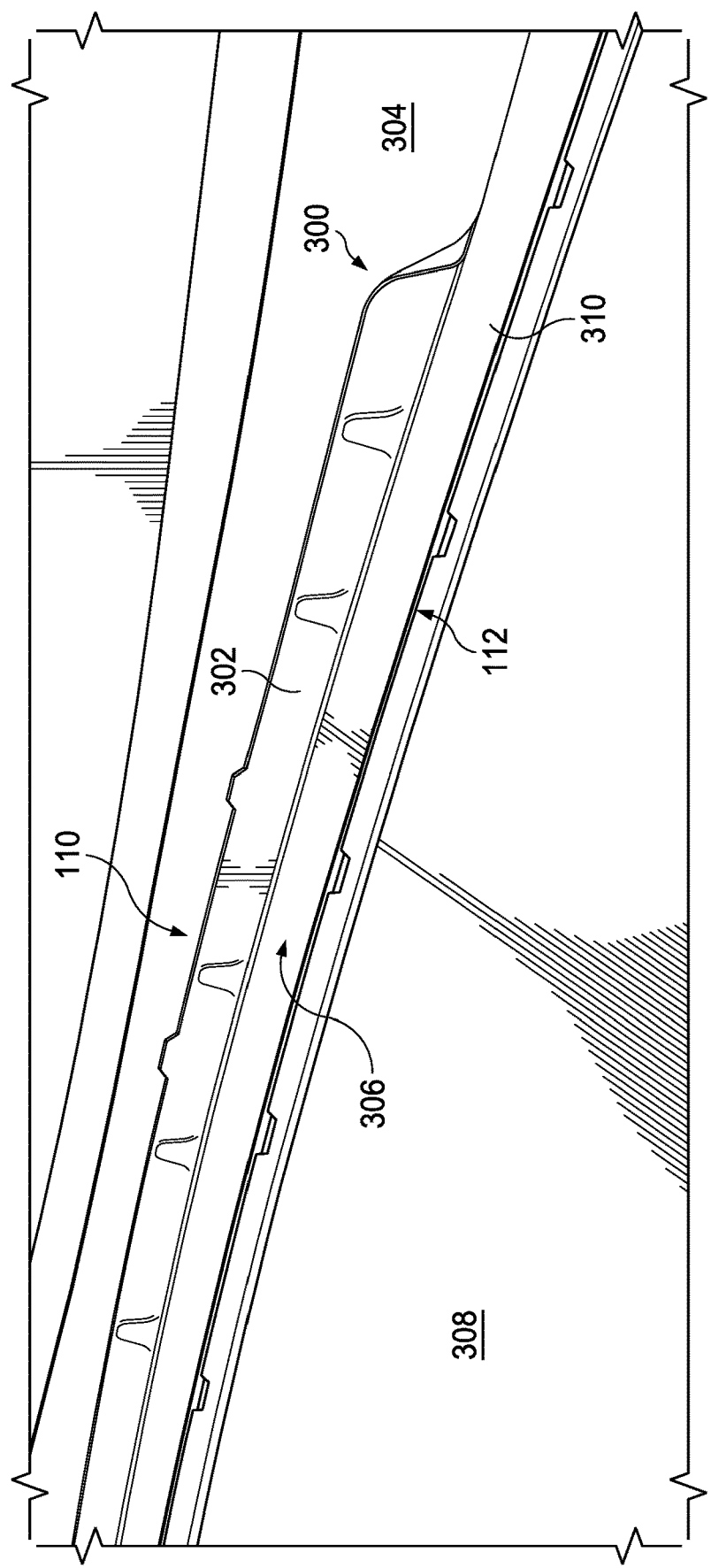
FIG. 3 is an illustration of a perspective view of a joint system installed at a fuselage to wing joint in accordance with an illustrative embodiment.

With reference next to FIG. 3, an illustration of a perspective view of a joint system installed at a fuselage to wing joint is depicted in accordance with an illustrative embodiment. FIG. 3 illustrates an example of physical implementations of components within joint system 210 shown in block form in FIG. 2. A more-detailed view of section 108 from FIG. 1 is shown.

As depicted, joint system 112 takes the form of monolithic upper chord assembly 300. Monolithic upper chord assembly 300 has upper vertical flange 302 connected to fuselage skin 304 and base plate 306 connected to wing skin 308. Fasteners (not shown in this view) connect upper vertical flange 302 to fuselage skin 304 and base plate 306 to wing skin 308, respectively.

No fasteners are needed to connect upper vertical flange 302 to base plate 306 since upper vertical flange 302 and base plate 306 are formed from continuous piece of material 310. Fuselage skin 304 and wing skin 308 are composite structures in this illustrative example.

Figure 4:
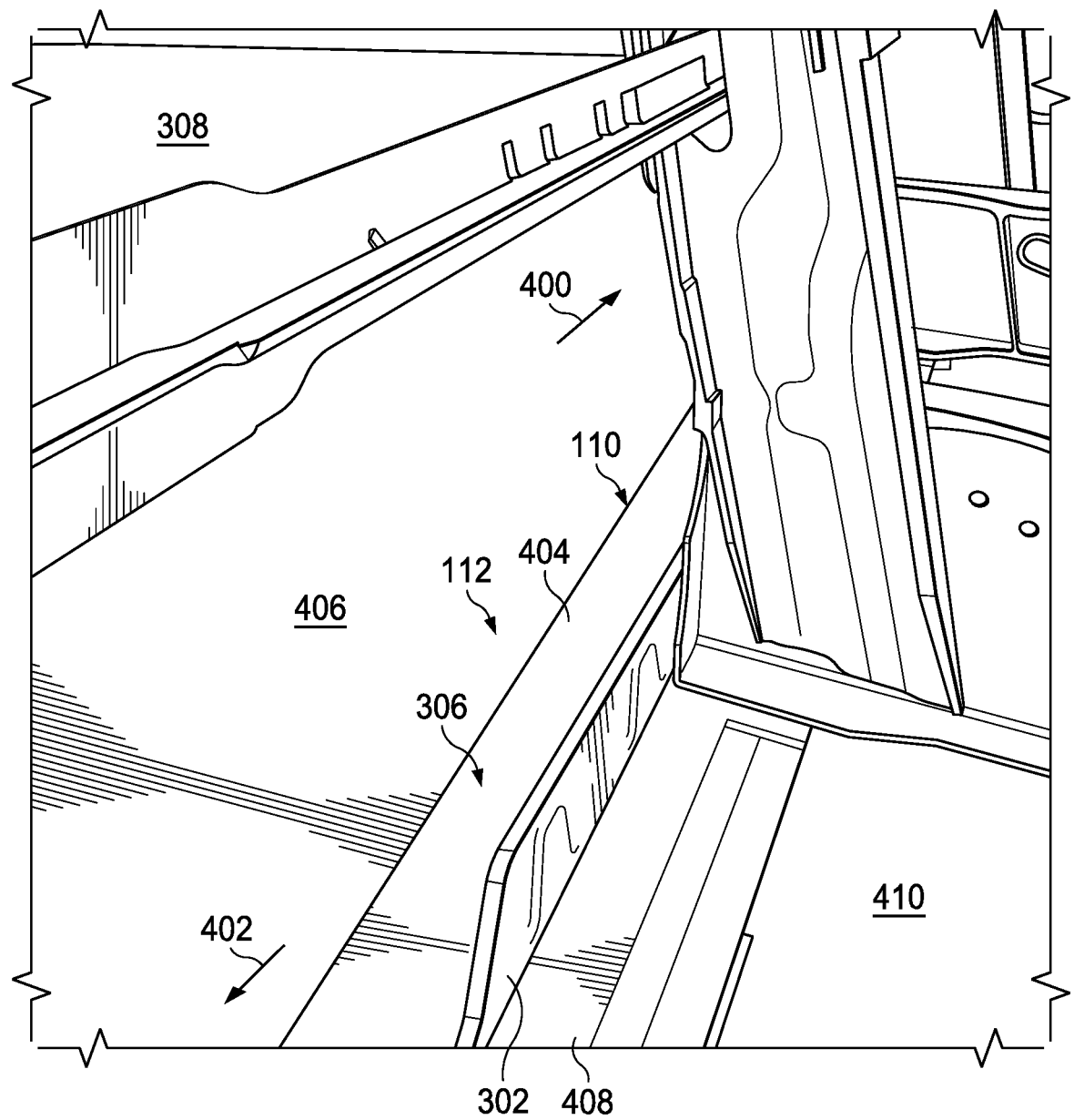
FIG. 4 is an illustration of a side view of a joint system installed at a fuselage to wing joint in accordance with an illustrative embodiment.

Turning now to FIG. 4, an illustration of a side view of a joint system installed at a fuselage to wing joint is depicted in accordance with an illustrative embodiment. FIG. 4 also illustrates an example of physical implementations of components within joint system 210 shown in block form in FIG. 2. This view is shown where forward is in the direction of arrow 400 and aft is in the direction of arrow 402. Additional components in aircraft 100 have been removed to show joint 110 in greater detail.

As illustrated, base plate 306 connects to wing skin 308 inside aircraft 100 as well as outside aircraft 100. Specifically, outer flange 404 of base plate 306 connects to outer wing skin 406 and inner flange 408 of base plate 306 connects to inner wing skin 410.

Figure 5:
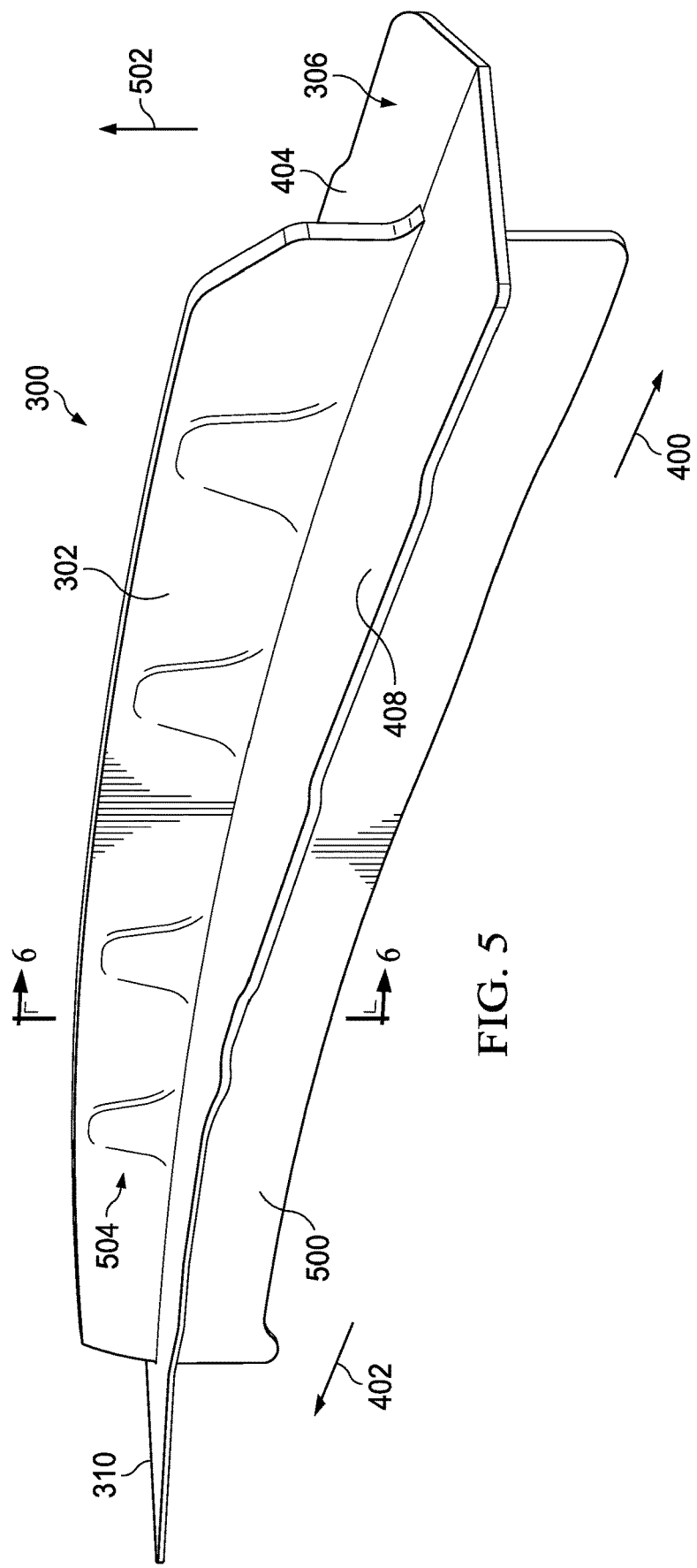
FIG. 5 is an illustration of a perspective view of a monolithic upper chord assembly in accordance with an illustrative embodiment.

In FIG. 5, an illustration of a perspective view of a monolithic upper chord assembly is depicted in accordance with an illustrative embodiment. In this illustrative example, monolithic upper chord assembly 300 is shown such that lower vertical flange 500 can be seen, where forward is in the direction of arrow 400, aft is in the direction of arrow 402, and upward is in the direction of arrow 502. Lower vertical flange 500, when installed in aircraft 100 in FIG. 1, connects to the side body rib web of wing 104. Monolithic upper chord assembly 300 is shown prior to drilling in this view. This illustrative example depicts monolithic upper chord assembly 300 for the left side of aircraft 100. However, monolithic upper chord assembly 300 may be used on the right side of aircraft 100 for the fuselage-to-wing joint as well. Damage containment features 504 are integrated into upper vertical flange 302 of monolithic upper chord assembly 300.

Turning next to FIG. 6, an illustration of a cross-sectional view of a monolithic upper chord assembly is depicted in accordance with an illustrative embodiment. This cross-sectional view is shown along the lines 6-6 in FIG. 5 and depicts the cruciform shape created when upper vertical flange 302, lower vertical flange 500, outer flange 404 of base plate 306 and inner flange 408 of base plate 306 are formed from one piece of material.

In this illustrative example, rotational and lateral deflection of the vertical flange occurs in the direction of arrow 600. To react loading and enforced displacements and avoid detrimental damage, damage containment features are implemented.

With reference now to FIG. 7, an illustration of a side view of a monolithic upper chord assembly with damage containment features is depicted in accordance with an illustrative embodiment. FIG. 7 shows monolithic upper chord assembly 300 in the inboard to outboard direction.

As illustrated, lower vertical flange 500 comprises flow holes 700. Flow holes 700 are configured to allow fluid to flow between sections of aircraft 100 such that pressure build up is reduced. Although five flow holes 700 are depicted in this view, more or fewer flow holes may be present.

Turning next to FIG. 8, an illustration of a monolithic upper chord assembly with damage containment features is depicted in accordance with an illustrative embodiment. FIG. 8 shows an example of five damage containment features 504 positioned along the length of monolithic upper chord assembly 300. Damage containment feature 800, damage containment feature 802, damage containment feature 804, damage containment feature 806, and damage containment feature 808 in damage containment features 504 are integrated in upper vertical flange 302 of monolithic upper chord assembly 300. These damage containment features reduce operating stresses at targeted regions and limit the total potential damage to be no larger than the required residual strength of a single failed adjacent frame segment, represented by distance 810. In this illustrative example, damage containment features 800, 802, 804, 806 and 808 are pad-ups.

Figure 9A:
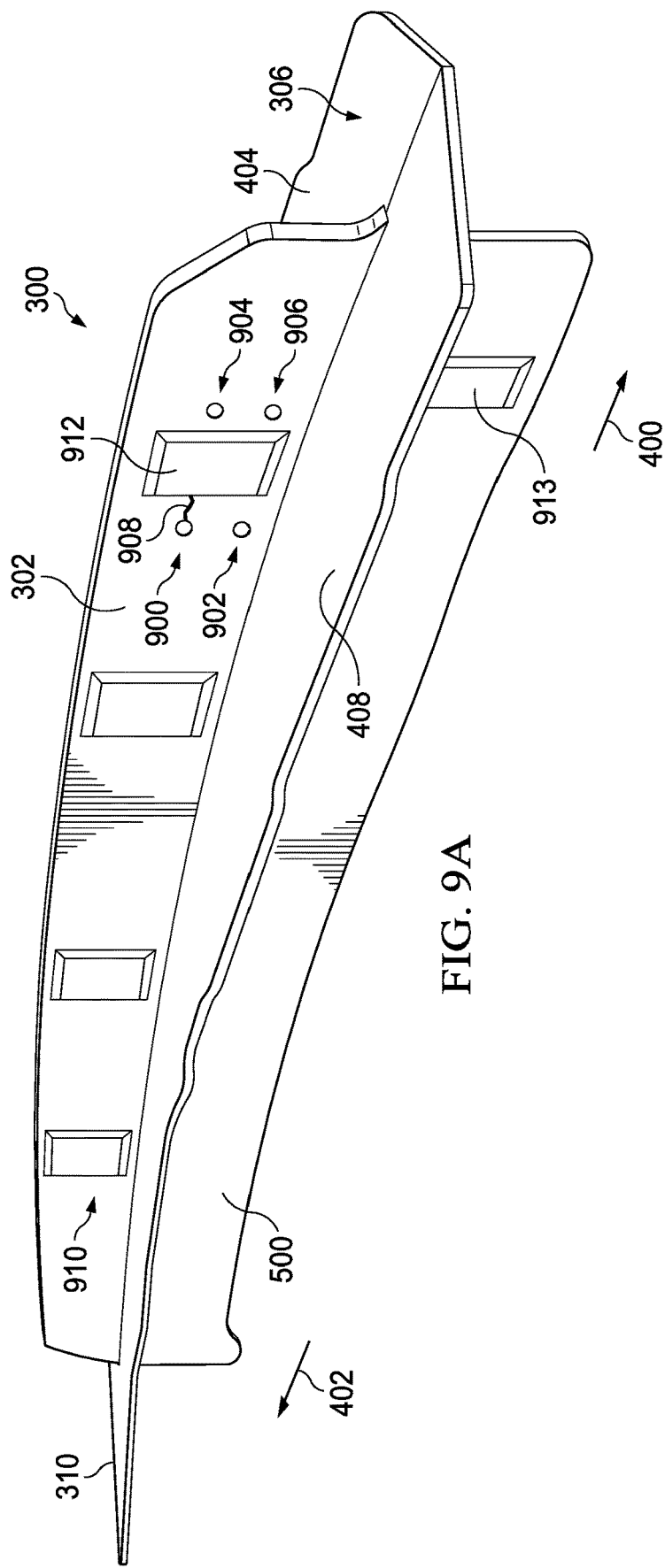
FIG. 9A-9C are illustrations of a perspective view of a monolithic upper chord assembly with damage containment features in accordance with an illustrative embodiment.
Figure 9B:
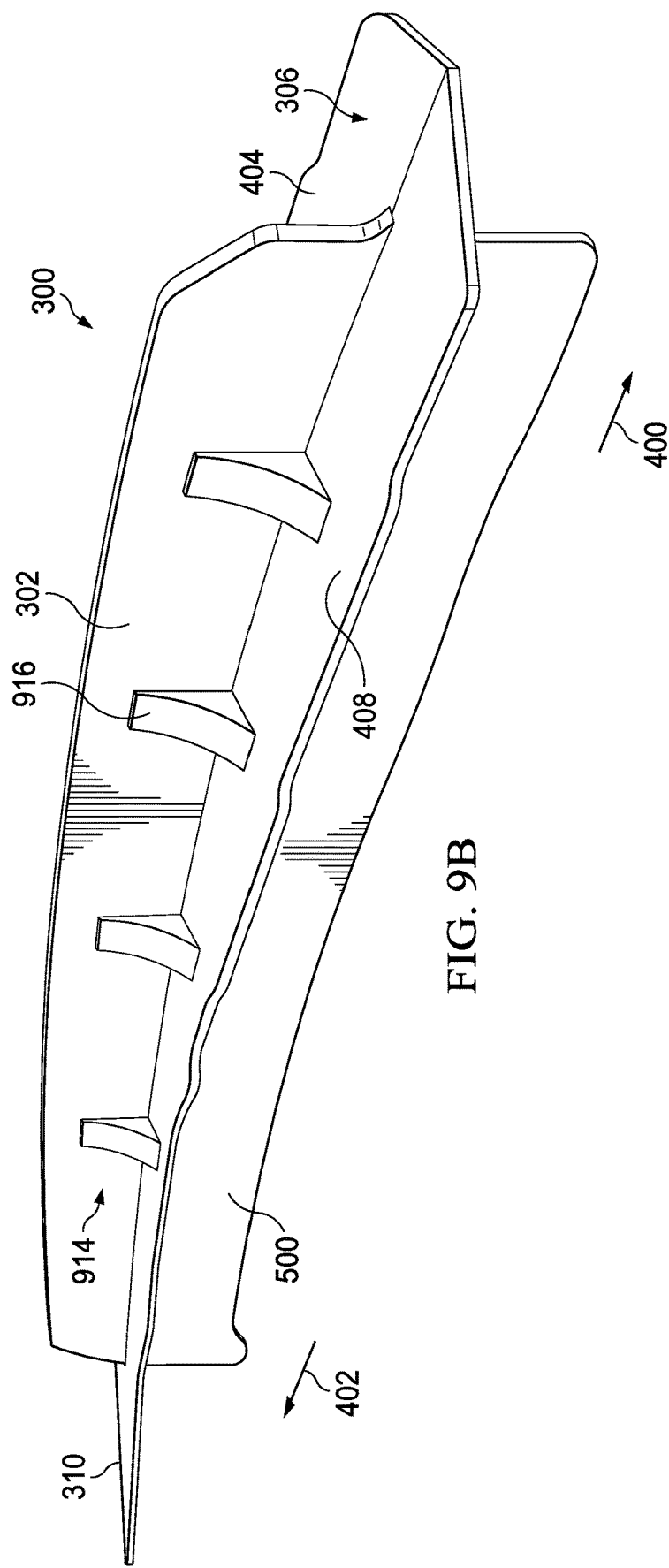
Figure 9C:
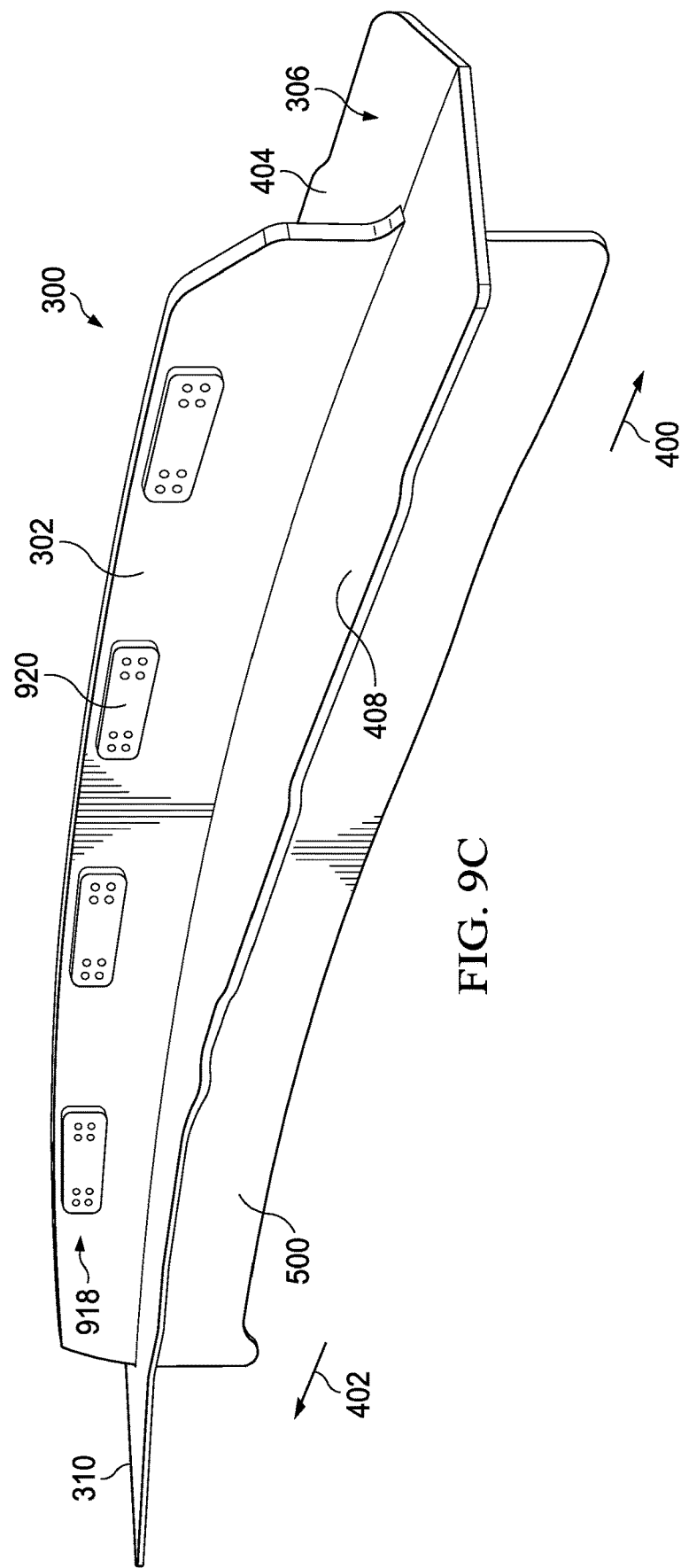

FIGS. 9A-9C are illustrations of a perspective view of a monolithic upper chord assembly with damage containment features in accordance with an illustrative embodiment. FIG. 9A shows damage containment features implemented with fastener details. Upper vertical flange 302 contains fastener detail 900, fastener detail 902, fastener detail 904, and fastener detail 906. Fastener details 900, 902, 904, and 906 are holes in this illustrative example. Crack 908 may form in fastener detail 900.

In this illustrative example, damage containment features 910 take the form of pad ups in upper vertical flange 302. Pad up 912 is positioned at fastener detail 900 to limit propagation of the crack tip of crack 908 as desired. Pad up 912 provides additional material within upper vertical flange 302 to reduce the operational stress state to a desired level. The use of pad ups ensures that damage growth (e.g., crack 908) is contained and isolated only to a specified length of upper vertical flange 302.

As illustrated, pad up 913 is also present in monolithic upper chord assembly 300. Pad up 913 is an example of a physical implementation for one of damage containment features 224 shown in block form in FIG. 2. Pad up 913 is located on lower vertical flange 500 in this illustrative example.

In FIG. 9A, the depiction of only four fastener details is not meant to be limiting. When installed in aircraft 100, hundreds of holes may be present. FIG. 9A is meant as a notational example of a crack at a fastener detail.

In FIG. 9B, damage containment features 914 take the form of gussets. Gusset 916 attaches upper vertical flange 302 to base plate 306. Gussets, such as gusset 916, prevent bending of upper vertical flange 302 to reduce the operational stress state at the critical details in a region of monolithic upper chord assembly 300. The use of gussets 914 ensures that damage growth is contained and isolated to only a specified length of the vertical flange, i.e., the distance between two gussets 914.

Turning next to FIG. 9C, damage containment features 918 take the form of doublers in this illustrative example. These doublers have been bolted onto upper vertical flange 302. Specifically, doubler 920 has been bolted onto upper vertical flange 302. Doublers, such as doubler 920, provide additional load path (hard point effect) within upper vertical flange 302 to reduce the operational stress state to a desired level. The use of bolted-on doublers ensures that damage growth is contained and isolated to only a specified length of upper vertical flange 302.

Although only one type of damage containment feature is shown in each of FIGS. 9A-9C, any type of damage containment features may be used in combination with one another. For example, without limitation, at least one of pad-ups, bolt-on doublers, gussets, or other features may be used along the length of upper vertical flange 302, base plate 306, or lower vertical flange 500 at the same time.

Figure 10:
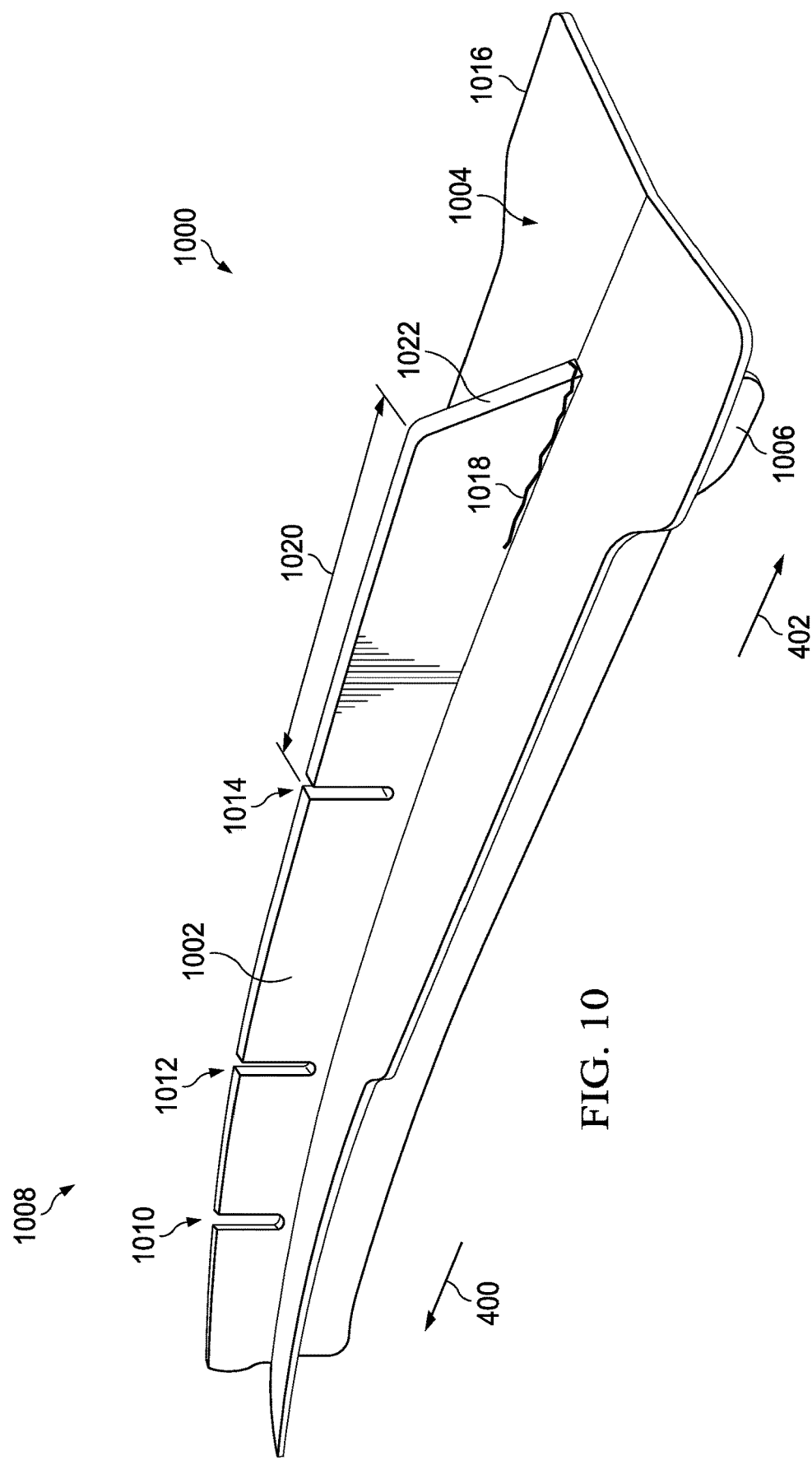
FIG. 10 is an illustration of a perspective view of a monolithic upper chord assembly with slots in accordance with an illustrative embodiment.

FIG. 10 shows a perspective view of a monolithic upper chord assembly with slots in accordance with an illustrative embodiment. Monolithic upper chord assembly 1000 is an alternative implementation for monolithic upper chord assembly 300 shown in FIGS. 3-5 and represents a physical implementation of components described with reference to joint system 210 in FIG. 2.

As illustrated, monolithic upper chord assembly 1000 has upper vertical flange 1002, base plate 1004, and lower vertical flange 1006. Upper vertical flange 1002 comprises slots 1008 formed in upper vertical flange 1002. Slots 1008 are damage containment features in this illustrative example. Slot 1010, slot 1012, and slot 1014 in slots 1008 each cut completely through the thickness of upper vertical flange 1002; however, in other illustrative examples, damage containment features may resemble other types of openings.

In this illustrative example, monolithic upper chord assembly 1000 with slots 1008 in upper vertical flange 1002 is formed from continuous piece of material 1016. Therefore, this one-piece joint assembly does not need fasteners to hold it together.

Damage propagation is limited to the distance between two of slots 1008. For example, if crack 1018 is formed in monolithic upper chord assembly 1000, its propagation is limited to no greater than distance 1020 between end 1022 of upper vertical flange 1002 and slot 1014.

The different components shown in FIG. 1 and FIGS. 3-10 may be combined with components in FIG. 2, used with components in FIG. 2, or a combination of the two. Additionally, some of the components in FIG. 1 and FIGS. 3-10 may be illustrative examples of how components shown in block form in FIG. 2 may be implemented as physical structures.

In some illustrative examples, damage containment features may not be visible to the naked eye. Instead, these damage containment features are integrated into the structure of the monolithic upper chord assembly without visible changes to the surface configuration of the structure.

Other configurations joint system 112 may be implemented other than those shown in FIG. 1 and FIGS. 3-10. The configurations described herein are not meant to be limited as to the placement, orientation, type, or configuration of damage containment features.

Figure 11:
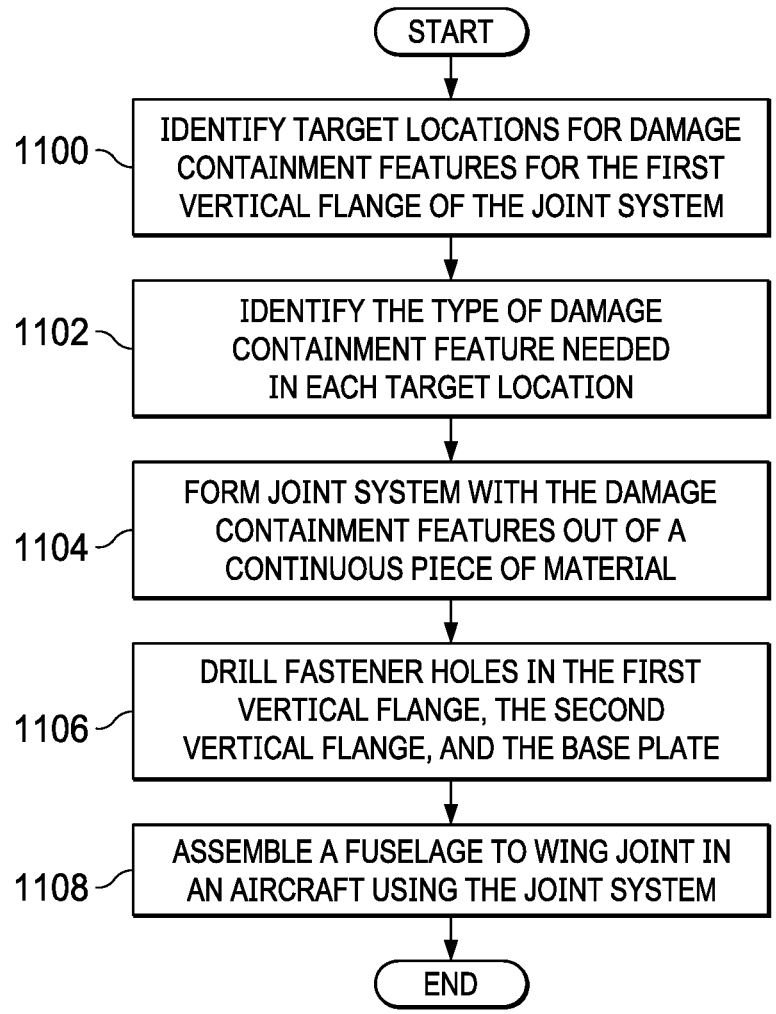
FIG. 11 is illustration of a flowchart of a process for forming a monolithic upper chord assembly in accordance with an illustrative embodiment.

With reference next to FIG. 11, an illustration of a flowchart of a process for forming a monolithic upper chord assembly is depicted in accordance with an illustrative embodiment. The method depicted in FIG. 11 may be used to form monolithic upper chord assembly 228 with damage containment features 224 in FIG. 2.

The process begins by identifying target locations for damage containment features for the first vertical flange of the joint system (operation 1100). The process next identifies the type of damage containment feature needed in each target location (operation 1102). Thereafter, the joint system with the damage containment features is formed out of a continuous piece of material (operation 1104). Fastener holes are drilled in the first vertical flange, the second vertical flange, and the base plate for installation (operation 1106). The joint system is then used to assemble a fuselage to wing joint in an aircraft (operation 1108), with the process terminating thereafter.

Figure 12:
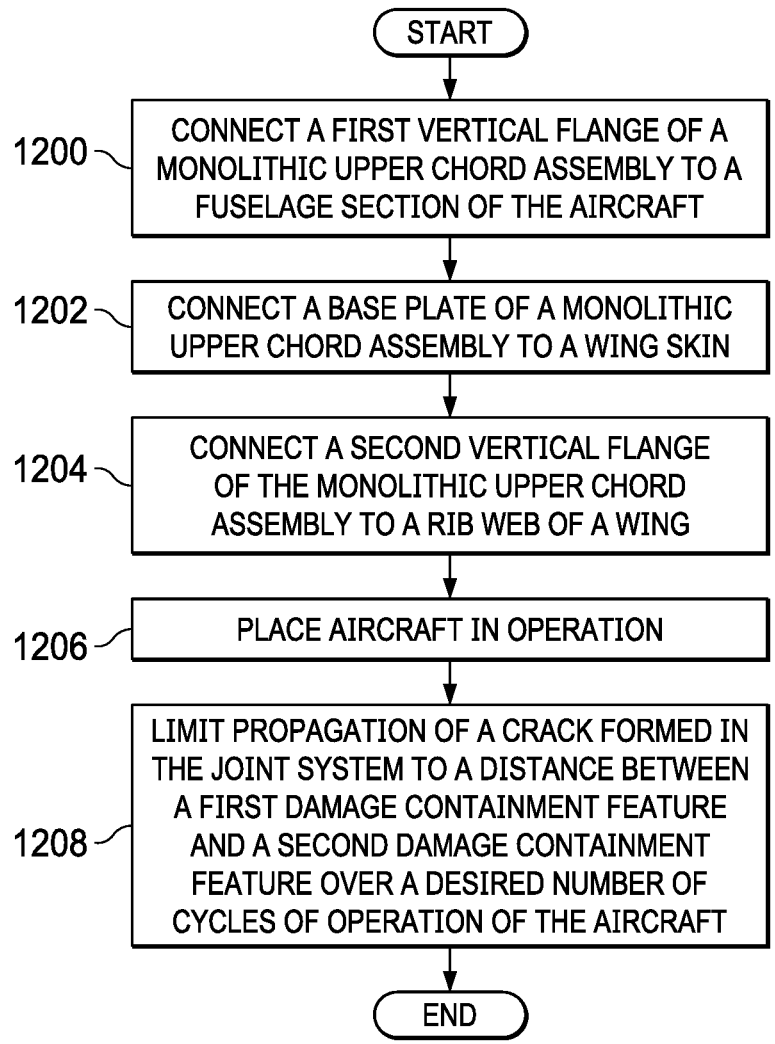
FIG. 12 is an illustration of a flowchart of a process for joining a fuselage section to a wing in an aircraft in accordance with an illustrative embodiment.

Turning to FIG. 12, an illustration of a flowchart of a process for joining a fuselage section to a wing in an aircraft is depicted in accordance with an illustrative embodiment. The method depicted in FIG. 12 may be used with monolithic upper chord assembly 228 with damage containment features 224 to join fuselage section 206 to wing 204 in FIG. 2. The process described in FIG. 11 is used to form the monolithic upper chord assembly for installation as described in this figure.

The process begins by connecting a first vertical flange of a monolithic upper chord assembly to a fuselage section of the aircraft (operation 1200). Next, the process connects a base plate of a monolithic upper chord assembly to a wing skin (operation 1202). A second vertical flange of the monolithic upper chord assembly is connected to a rib web of a wing (operation 1204). The aircraft is placed in operation (operation 1206). During operation of the aircraft, the process limits propagation of a crack formed in the joint system to a distance between a first damage containment feature and a second damage containment feature over a desired number of cycles of operation of the aircraft (operation 1208), with the process terminating thereafter.

Figure 13:
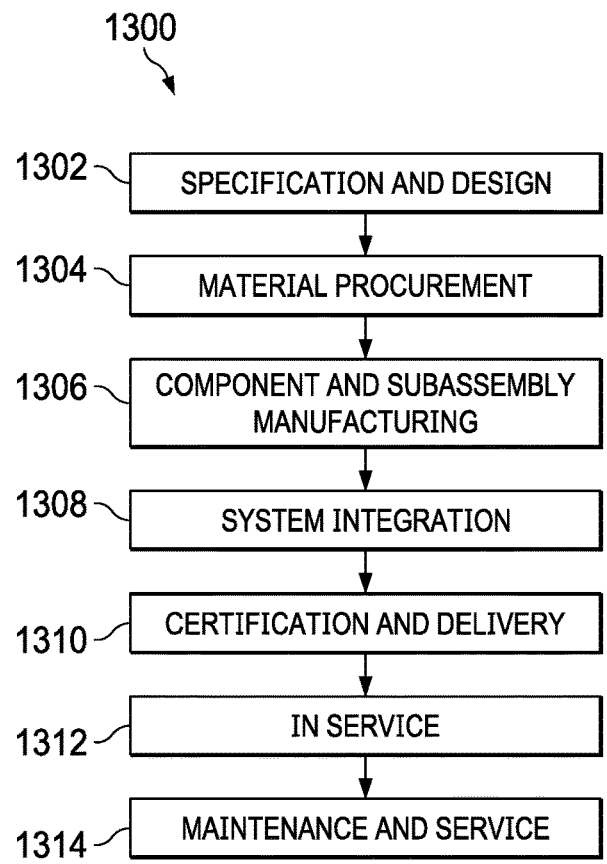
FIG. 13 is an illustration of a block diagram of an aircraft manufacturing and service method in accordance with an illustrative embodiment.
Figure 14:
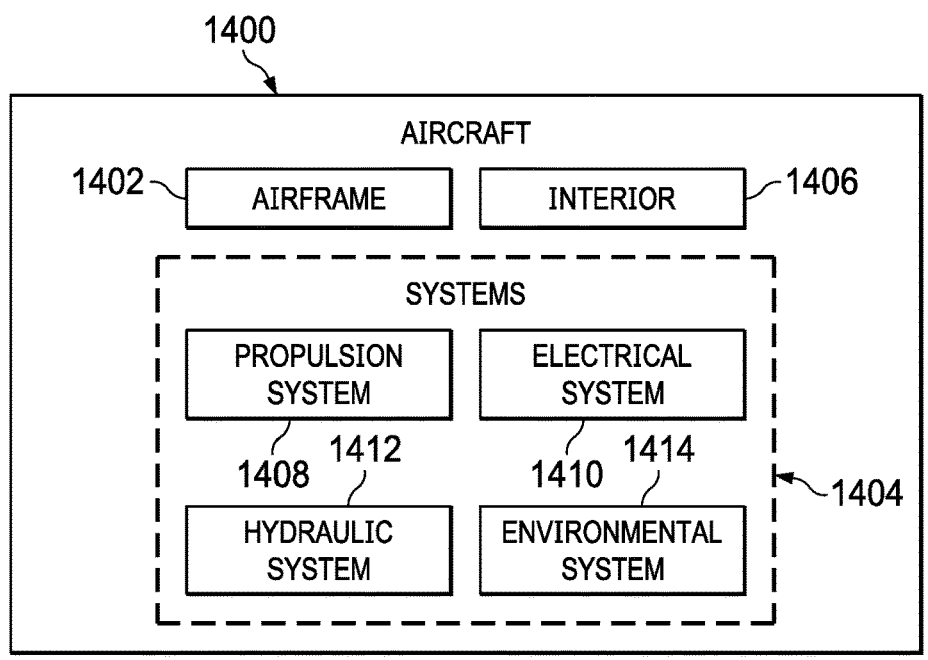
FIG. 14 is an illustration of a block diagram of an aircraft in which an illustrative embodiment may be implemented.

Illustrative embodiments of the disclosure may be described in the context of aircraft manufacturing and service method 1300 as shown in FIG. 13 and aircraft 1400 as shown in FIG. 14. Turning first to FIG. 13, an illustration of a block diagram of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Joint system 210 from FIG. 2 may be used to join wing 204 to fuselage section 206 to provide damage containment at joint 208 during component and subassembly manufacturing 1306. In addition, joint system 210 may be added or reworked during routine maintenance and service 1314 as part of a modification, reconfiguration, or refurbishment of aircraft 1400 in FIG. 14.

Each of the processes of aircraft manufacturing and service method 1300 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 14, an illustration of a block diagram of an aircraft is depicted in which a composite structure made using an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13. In one illustrative example, components or subassemblies produced in component and subassembly manufacturing 1306 in FIG. 13 may be fabricated or manufactured in a manner similar to components or subassemblies produced while aircraft 1400 is in service 1312 in FIG. 13. As yet another example, one or more apparatus embodiments, method embodiments, or a combination thereof may be utilized during production stages, such as component and subassembly manufacturing 1306 and system integration 1308 in FIG. 13. One or more apparatus embodiments, method embodiments, or a combination thereof may be utilized while aircraft 1400 is in service 1312, during maintenance and service 1314 in FIG. 13, or both. The use of a number of the different illustrative embodiments may substantially expedite the assembly of aircraft 1400, reduce the cost of aircraft 1400, or both expedite the assembly of aircraft 1400 and reduce the cost of aircraft 1400.

With the use of an illustrative embodiment, damage containment features resist crack propagation at critical points in the joint between the fuselage and the wing. Since the disclosed joint system is a one-piece solution, no fasteners are needed to connect the upper vertical flange, lower vertical flange, and base plate. Significant weight savings and manpower savings are realized. Further, the joint system is forged more quickly than with currently used solutions and out of a single type of material. A fuselage-to-wing joint configured in this manner can be used with composite aircraft.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A joint system for an aircraft comprising:
a first vertical flange connected to a fuselage section of the aircraft, wherein the first vertical flange comprises a continuous piece of material along an upper chordwise length of a wing of the aircraft;
a base plate connected to the first vertical flange and connected to a wing skin of the aircraft;
a second vertical flange connected to the base plate opposite the first vertical flange, wherein the second vertical flange is connected to a rib web of the wing of the aircraft and wherein the first vertical flange, the second vertical flange, and the base plate are monolithic and formed from the continuous piece of material; and
damage containment features associated with the first vertical flange of the joint system and configured to slow propagation of a crack in the first vertical flange.

2. The joint system of claim 1, wherein the first vertical flange bifurcates the base plate into a lateral portion and a medial portion, the lateral portion connected to a portion of the wing skin outside of the aircraft and the medial portion connected to a portion of the wing skin inside of the aircraft.

3. The joint system of claim 1, wherein the second vertical flange is connected to both an upper portion of the wing skin and a lower portion of the wing skin.

4. The joint system of claim 1, wherein the continuous piece of material comprises titanium.

5. The joint system of claim 4, wherein the base plate comprises additional damage containment features.

6. The joint system of claim 4, wherein the second vertical flange comprises additional damage containment features.

7. The joint system of claim 4 further comprising:
fastener holes formed in the base plate, wherein one of the damage containment features is located between two fastener holes.

8. The joint system of claim 1 further comprising:
fastener holes formed in the first vertical flange, wherein one of the damage containment features is located between two fastener holes.

9. The joint system of claim 1, wherein the joint system connects to a skin of the fuselage section comprising composite material and a frame of the fuselage section comprising the composite material.

10. The joint system of claim 1, wherein the propagation of a crack is limited to no greater than a distance between a first damage containment feature and a second damage containment feature.

11. A monolithic upper chord assembly for a composite aircraft comprising:
a first vertical flange connected to a fuselage skin of the aircraft, wherein the first vertical flange comprises a continuous piece of material along an upper chordwise length of a wing of the aircraft;
a base plate connected to the first vertical flange;
a second vertical flange connected to the base plate opposite the first vertical flange and connected to a rib web of a wing of the aircraft, wherein the first vertical flange, the second vertical flange, and the base plate are monolithic and formed from the continuous piece of material; and
damage containment features associated with at least one of the first vertical flange, the base plate and the second vertical flange.

12. The monolithic upper chord assembly of claim 11, wherein the damage containment features comprise at least one of clips, slots, pad ups, doublers, or gussets.

13. The monolithic upper chord assembly of claim 11 further comprising:
fastener holes formed in the first vertical flange, wherein one of the damage containment features is located between two fastener holes; and
fastener holes formed in the base plate, wherein one of the damage containment features is located between two fastener holes.

14. The monolithic upper chord assembly of claim 11, wherein the damage containment features comprise:
slots formed in the first vertical flange.

15. The monolithic upper chord assembly of claim 14, wherein one of the damage containment features aligns with a structural component in a frame of a fuselage section when the first vertical flange of the monolithic upper chord assembly is connected to the fuselage section.

16. The monolithic upper chord assembly of claim 11, wherein propagation of a crack is limited to a distance between a first damage containment feature and a second damage containment feature over a desired number of cycles of operation of the composite aircraft.

17. A method for joining a fuselage section to a wing in an aircraft, the method comprising:
connecting a first vertical flange of a joint system to the fuselage section of the aircraft, wherein the first vertical flange comprises damage containment features configured to slow propagation of a crack in the first vertical flange;
connecting a base plate of the joint system to a wing skin; and
connecting a second vertical flange of the joint system to a rib web of the wing, wherein the first vertical flange is connected to the base plate and the second vertical flange is connected to the base plate opposite the first vertical flange, wherein the first vertical flange, the second vertical flange and the base plate are monolithic and formed from a continuous piece of material along an upper chordwise length of the wing.

18. The method of claim 17 further comprising:
forming the joint system out of the continuous piece of material.

19. The method of claim 18 further comprising:
identifying target locations for the damage containment features; and
forming at least one of the first vertical flange, the second vertical flange, and the base plate of the joint system with the damage containment features at the target locations.

20. The method of claim 17 further comprising:
limiting the propagation of the crack to no greater than a distance between a first damage containment feature and a second damage containment feature.

* * * * *